(12) United States Patent
Davis

(10) Patent No.: US 10,293,230 B1
(45) Date of Patent: May 21, 2019

(54) FLEXIBLE GOLF GRIP WITH FULL THICKNESS RIB SECTION AND METHOD OF MAKING SAME

(71) Applicant: Eaton Intelligent Power Limited, Dublin (IE)

(72) Inventor: Stephen James Davis, Pinehurst, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/916,401

(22) Filed: Mar. 9, 2018

(51) Int. Cl.
*A63B 53/14* (2015.01)
*A63B 60/08* (2015.01)
*A63B 60/10* (2015.01)

(52) U.S. Cl.
CPC .............. *A63B 60/08* (2015.10); *A63B 53/14* (2013.01); *A63B 60/10* (2015.10)

(58) Field of Classification Search
CPC ......... A63B 60/08; A63B 53/14; A63B 60/10; A63B 60/12; A63B 60/18
See application file for complete search history.

(56) References Cited

U.S. PATENT DOCUMENTS

| | | | | | |
|---|---|---|---|---|---|
| 5,261,665 | A | * | 11/1993 | Downey | A63B 53/14 473/303 |
| 5,322,290 | A | * | 6/1994 | Minami | A63B 53/14 473/201 |
| 6,666,777 | B1 | * | 12/2003 | Lamkin | A63B 53/14 473/300 |
| 7,435,186 | B1 | * | 10/2008 | Miller | A63B 53/14 473/300 |
| 7,749,094 | B2 | * | 7/2010 | Chen | A63B 53/14 473/300 |
| 7,891,270 | B2 | * | 2/2011 | Higashi | B62K 21/26 16/421 |
| 8,485,916 | B2 | | 7/2013 | Gill et al. | |
| 2003/0228929 | A1 | * | 12/2003 | Miyasu | A63B 60/00 473/300 |
| 2006/0287123 | A1 | * | 12/2006 | Wang | A63B 60/00 473/300 |
| 2007/0287551 | A1 | | 12/2007 | Wang et al. | |
| 2008/0227562 | A1 | | 9/2008 | Gill | |
| 2011/0172024 | A1 | * | 7/2011 | Lu | A63B 49/08 473/300 |
| 2016/0271467 | A1 | * | 9/2016 | Wallin | A63B 53/14 |

\* cited by examiner

*Primary Examiner* — Stephen L Blau
(74) *Attorney, Agent, or Firm* — Fay Sharpe LLP

(57) ABSTRACT

A flexible elastomeric grip for a golf club has an elastomeric insert extending fully through the wall of the tubular grip and exposed on its exterior surface. The insert is comprised of a material having greater stiffness than the body material for enhancing gripability.

1 Claim, 3 Drawing Sheets

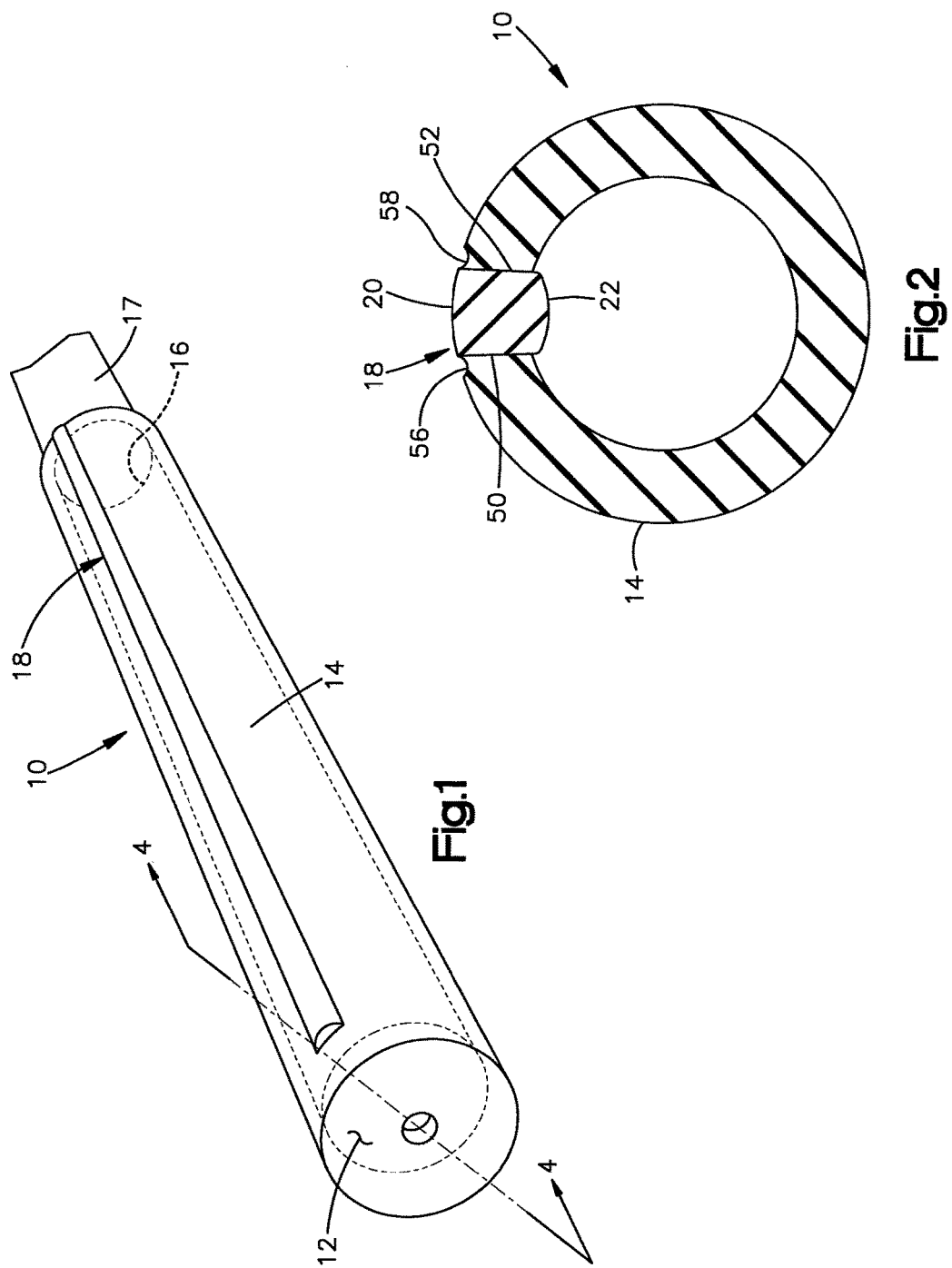

FLEXIBLE GOLF GRIP WITH FULL THICKNESS RIB SECTION AND METHOD OF MAKING SAME

BACKGROUND

The present disclosure relates to flexible grips for golf clubs. Currently such grips are compression molded of elastomeric material and may have an elongated raised rib embedded on the exterior of the grip to facilitate visual and tactile orientation of the grip in the user's hands and to enhance the alignment of the club. Heretofore, the rib has been formed by designing a protruding ridge on the inner diameter surface of the grip and adding a corresponding exterior strip of elastomer on the exterior surface. The interior ridge is formed as part of the grip body material. The exterior strip of elastomer is formed of a different elastomer than the body and may have a different hardness, texture, and color to distinguish it from the grip body. When installed over a golf shaft the inner ridge compresses and deforms the elastomer and forms a raised "reminder rib" on the exterior of the grip.

Forming the exterior strip on the grip body requires a compression molding process whereby body material parts are placed in the mold over which is placed the exterior rib strip. The placement of the exterior rib strip must be carefully and precisely controlled as well as the volume of body materials so that when the compression molding sequence occurs, the elevated temperatures and pressures in molding do not displace the exterior rib strip. In this process, it has been found difficult to maintain and control the positioning of the material for the rib during the compression molding. Where the rib is formed of material of a different color than the surrounding material of the grip, movement of the rib material during molding produces an unwanted and distorted configuration of the rib and thus, an unacceptable appearance to the product.

Referring to FIG. 5, the cross-section of a prior art flexible grip of the compression molded type employing a rib is illustrated generally at 1 and has an annular body 2 formed having an exterior rib strip 3 of elastomer disposed in a recess 4 provided in the surrounding elastomeric material which is formed by compression molding for simultaneously curing the exterior rib strip 3 and the elastomeric material of the body 2. The grip 1 is shown assembled on a club shaft 5.

It has thus been desired to find a way or means of providing a rib structure in a flexible golf grip that is more pronounced and less costly and more easily manufactured.

BRIEF DESCRIPTION

The present disclosure describes a flexible grip for a golf club of the type having an exterior elongated rib on the outer surface which facilitates orientation in the user's hand and enhances gripability and which is less costly and simpler to manufacture than the compression molded ribbed golf club grips currently produced. The grip of the present disclosure employs an insert formed of elastomer extending through the full wall thickness of the tubular grip and comprised of a material having greater stiffness than that of the surrounding grip material. The insert is preferably formed separately and placed between a core bar with a groove corresponding with the interior geometry of the insert, and a surrounding mold cavity which has ridges surrounding the insert on the exterior surface of the mold cavity. The insert is secured in place by the groove in the corebar and the ridges in the mold cavity. The mold is designed with injection sprues located and oriented to direct the flow of elastomeric material injected into the mold to fill the molding cavity surrounding the core bar with elastomeric material which, upon molding, bonds to the opposite sides of the insert, thus forming an integral unitary flexible grip upon removal from the mold and removal of the core bar.

In one version, the insert has its inner surface designed with a raised ridge such that upon assembly onto a club shaft, the elastomer is deformed such that the exterior surface of the insert is raised slightly from the exterior surface of the surrounding material of the grip to form a raised rib. If desired, the outer surface of the rib may have formed thereon grooves on either side of the exterior rib to further identify the rib and provide isolation from the grip body, which further enhances the presence of the rib. The exterior surface of the rib may have a different textured surface than the grip body for further enhancing presence and gripability. In one version of the grip of the present disclosure, the elastomeric insert has a durometer hardness in the range of 65 to 80 on the Shore "A" scale; and, the elastomer of the body of the tubular grip has a hardness in the range of 30-60 on the Shore "A" scale. Upon assembly onto a club shaft, portions of the insert may extend outwardly from the surface of the surrounding grip material by an amount not greater than 1 mm, which is the current limit specified by the United States Golf Association and the Royal And Ancient Golf Club. However, it will be understood that a raised rib height greater than 1 mm may be employed if the applicable rules of the golf game allow such.

BRIEF DESCRIPTION OF THE DRAWINGS

FIG. 1 is a perspective view of a finished flexible grip in accordance with the present disclosure as installed on the shaft of a golf club;

FIG. 2 is a cross-section of the grip of the present disclosure as it appears upon removal from the mold;

DETAILED DESCRIPTION

Referring to FIG. 1, a perspective view of a finished flexible grip for a golf club is illustrated generally at 10 and has a tubular body 14 with a substantially closed end 12 and an open end 16 indicated by dashed line which has received therein the end of a club shaft 17. An elongated insert indicated generally at 18 is formed in the grip during molding as will hereinafter be described in greater detail.

Figure 4:
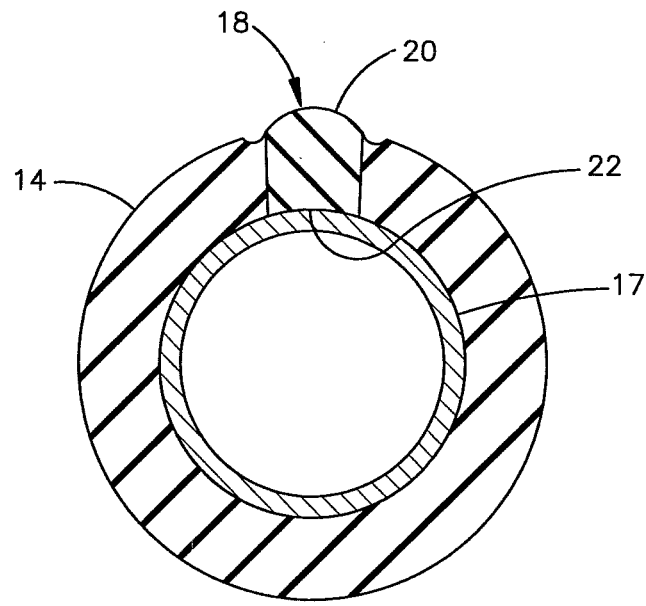
FIG. 4 is a cross-section taken along section indicating lines 4-4 of FIG. 1; and, FIG. 5 is a cross-section of a prior art grip with an inlaid rib assembled onto a club shaft.
Figure 5:
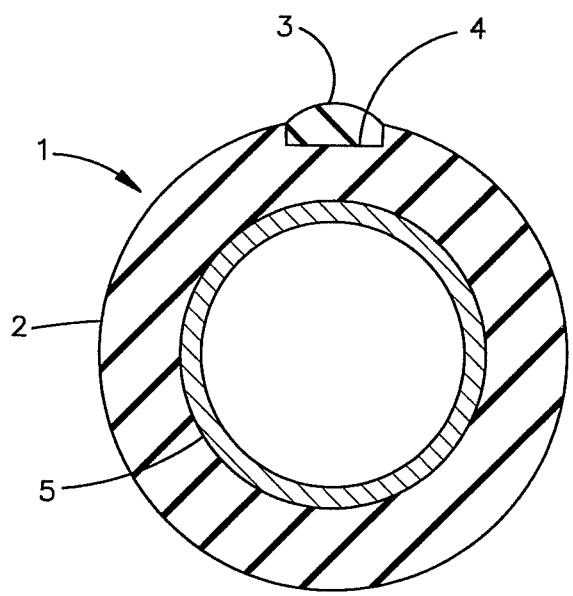

Referring to FIG. 4, one version of the golf grip of the present disclosure is shown in cross section as assembled onto a club shaft, with the insert 18 shown as extending completely through the wall thickness of the tubular grip body 14 from the interior thereof to the exterior. The exterior surface of the insert has been slightly deformed to provide a raised rib configuration. In the present practice, the exterior surface 20 of the rib 18 may extend outwardly from the exterior surface of the tubular body 14 by about 1 mm. This is effected by deflection or deformation of the inner surface of the insert upon assembly over the club shaft 17.

Figure 3:
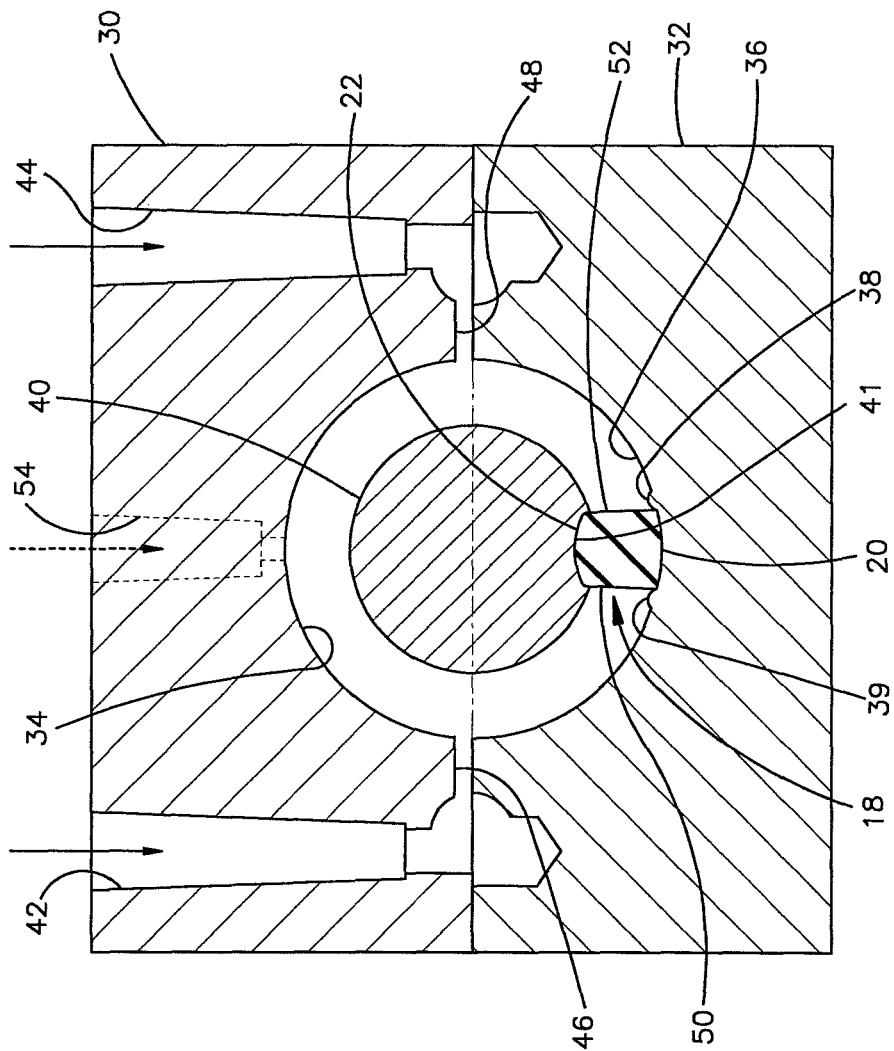
FIG. 3 is a cross-section of the mold with the insert and core bar in place before injection molding.

Referring to FIGS. 2 and 3, an upper section of a compression mold 30 is shown assembled on a lower section 32 along a parting line indicated "PL" in FIG. 3. The upper section 30 of the mold has a molding cavity 34 formed therein which may have the surface thereof configured to provide graphic design or texture to the exterior surface of the grip body 14. The lower section of the mold 32 has a corresponding mold cavity 36, which may also be configured to provide graphic design or texture to the exterior surface of the grip body 14; and, cavity 36 has formed therein spaced ridges 38, 39 formed at the bottom thereof which have disposed therebetween the outer surface 20 of the elastomeric insert 18.

A core bar 40 is disposed centrally in the cavities 34, 36; and, the core bar 40 has a groove 41 formed on the lower portion thereof which has received therein the inner surface 22 of the insert 18 for aiding in positioning and maintaining the insert in place during molding.

The upper mold section 30 has a pair of downwardly extending molding sprues 42, 44 formed therein disposed respectively on opposite sides of the insert 18. Each the sprues 42, 44 communicates respectively with a cross passage 46, 48 respectively, which cross passages 46, 48 communicate with opposite sides of the molding cavities 34, 36. In the present practice, with the core bar 40 and insert 18 in place, elastomeric material (not shown) is injected downwardly through sprues 42, 44 and passages 46, 48 into the molding cavities 34, 36 and fills these cavities and the elastomeric material (not shown) contacts and bonds to the sides 50, 52 of the insert 18 upon molding. Alternatively, a single central molding sprue 54, shown in dashed outline, may be provided in the upper mold section 30 to permit injection molding of elastomer downwardly into the upper surface of cavity 34 such that the elastomer flows about the core bar and onto the sides 50, 52 of the insert 18.

Referring to FIG. 2, the cured grip with the insert 18 integrally molded therein is shown as it appears upon removal from the mold and removal of the core bar with the lower surface of the rib 22 shown extending slightly into the inner periphery of the body 14. The upper surface 20 of the rib has a groove 56, 58, respectively, adjacent each of the sides 50, 52 as formed by the ridges 38, 39 in the lower mold section 32.

The present disclosure thus describes a unique flexible grip for a golf club having an integrated full thickness rib formed of elastomeric material having greater stiffness than the grip body. The insert extends fully through the wall thickness of the grip and has the upper or outer surface of the insert exposed to the exterior of the tubular grip for facilitating orientation of the grip in the user's hands and enhancing gripability. As shown in FIG. 4, upon assembly of the cured grip to the club shaft, the inner periphery of the tubular member 14 closely inter-fits and is in direct contact with the outer surface of the club shaft, and portions of the upper surface of the insert may extend outwardly an amount of about 1 mm. In the present practice, it has been found satisfactory to form the insert 18 of elastomeric material having a stiffness at least ten percent (10%) greater than that of material of the tubular body 14. The increased stiffness may also be accomplished by fiber reinforcement locally or generally. The insert 18 may also be formed of elastomeric material having a different feel or tactile perception upon being gripped. This may be accomplished by incorporating particulate matter such as glass or sand in the material to give the surface a different discernable roughness for enhanced gripability. In the present practice, the elastomeric rib has a durometer hardness in the range of 65 to 80 on the Shore "A" scale; and, the material of the body of the tubular grip has a hardness in the range of 30-60 on the Shore "A" scale. In the practice of the method of the present disclosure, the insert is assembled into a mold with the core bar; and, elastomeric material is injected into the mold cavity surrounding the core bar wherein the injected elastomer is bonded to the sides of the insert during molding. In the present practice, the insert 18 may be formed of pre-cured elastomer, may be of different elastomeric material than that of the body of the tubular grip; and, the insert may be of a different color, and of a different texture.

The exemplary embodiment has been described and illustrated with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A flexible tubular grip for being received over the shaft of a golf club comprising:
   (a) a tubular member formed of elastomeric material having a substantially closed end and an open end;
   (b) an elongated insert disposed in the tubular member and having a first surface exposed to the outer surface of the tubular member with the insert extending inwardly completely through the wall of the tubular member to have a second surface opposite the first surface exposed to and extending into the inner periphery of the tubular member, wherein, upon assembly of the grip over the shaft of the golf club, the insert is deformed such that a portion of the first surface is raised from the exterior surface of the elastomeric material of the tubular member.

* * * * *